(12) United States Patent
Napier et al.

(10) Patent No.: US 8,839,625 B2
(45) Date of Patent: Sep. 23, 2014

(54) GAS TURBINE ENGINE DIFFUSER HAVING AIR FLOW CHANNELS WITH VARYING WIDTHS

(75) Inventors: James C. Napier, San Diego, CA (US); Anthony C. Jones, San Diego, CA (US)

(73) Assignee: Hamilton Sunstrand Corporation, Windsor Locks, CT (US)

( * ) Notice: Subject to any disclaimer, the term of this patent is extended or adjusted under 35 U.S.C. 154(b) by 950 days.

(21) Appl. No.: 12/796,028

(22) Filed: Jun. 8, 2010

(65) Prior Publication Data

US 2011/0296841 A1 Dec. 8, 2011

(51) Int. Cl.
| | |
|---|---|
| *F04D 29/44* | (2006.01) |
| *F04D 29/54* | (2006.01) |
| *F02C 7/04* | (2006.01) |
| *F01D 9/02* | (2006.01) |

(52) U.S. Cl.
CPC ............... *F02C 7/04* (2013.01); *F04D 29/547* (2013.01); *F01D 9/02* (2013.01); *F04D 29/444* (2013.01)
USPC .................. 60/751; 415/208.2; 415/211.1

(58) Field of Classification Search
CPC ... F04D 29/44; F04D 29/444; F04D 29/2255; F04D 29/547
USPC ............... 60/751, 772, 805, 39.15; 415/1, 415/208.2–208.4, 211.1, 211.2
See application file for complete search history.

(56) References Cited

U.S. PATENT DOCUMENTS

| | | | | |
|---|---|---|---|---|
| 3,778,186 | A | * | 12/1973 | Bandukwalla ................ 415/181 |
| 3,860,360 | A | * | 1/1975 | Yu ............................. 415/208.3 |
| 3,904,312 | A | * | 9/1975 | Exley ............................. 415/181 |
| 3,917,434 | A | * | 11/1975 | Bandukwalla ................ 415/181 |
| 3,930,746 | A | * | 1/1976 | Kronogard .................. 415/149.1 |
| 3,963,369 | A | * | 6/1976 | Balje ............................ 415/148 |
| 4,022,541 | A | * | 5/1977 | Perrigo et al. ................ 415/207 |
| 4,099,891 | A | * | 7/1978 | Campbell ..................... 415/207 |
| 4,344,737 | A | * | 8/1982 | Liu ............................ 415/199.1 |
| 4,349,314 | A | | 9/1982 | Erwin |
| 4,431,374 | A | | 2/1984 | Benstein et al. |
| 4,573,868 | A | | 3/1986 | Stroem et al. |
| 4,900,225 | A | | 2/1990 | Wulf et al. |
| 6,589,015 | B1 | | 7/2003 | Roberts et al. |
| 7,101,151 | B2 | | 9/2006 | Loringer et al. |
| 7,140,839 | B2 | | 11/2006 | McAuliffe et al. |
| 7,407,367 | B2 | | 8/2008 | McAuliffe et al. |
| 7,442,006 | B2 | * | 10/2008 | Nguyen et al. ............. 415/208.4 |
| 2005/0118019 | A1 | | 6/2005 | Roberts et al. |
| 2008/0213092 | A1 | * | 9/2008 | Guo et al. ................... 415/210.1 |
| 2008/0256926 | A1 | | 10/2008 | Ziaei et al. |

* cited by examiner

*Primary Examiner* — William H Rodriguez
*Assistant Examiner* — Carlos A Rivera
(74) *Attorney, Agent, or Firm* — Carlson, Gaskey & Olds, P.C.

(57) ABSTRACT

An exemplary diffuser includes a plurality of air flow channels defined by a corresponding plurality of vanes. The vanes extend from a first side of the diffuser and define a width of the air flow channel between the corresponding plurality of vanes. The first side has at least one tapered surface extending from an inner radial position to an outer radial position. The distance between a tapered surface and a top side of the plurality of the vanes defines a depth of the air flow channel. The width of the air flow channel varies relative to the depth of the air flow channel along the length of the air flow channel.

14 Claims, 4 Drawing Sheets

… (US 8,839,625 B2)

GAS TURBINE ENGINE DIFFUSER HAVING AIR FLOW CHANNELS WITH VARYING WIDTHS

BACKGROUND

This disclosure relates to a diffuser for directing air from a compressor of a gas turbine engine. More particularly, this disclosure relates to a diffuser that includes a channel defined between vanes and including a tapered surface Gas turbine engine compressors utilize diffusers for directing air flow to a combustor. Diffusers may incorporate vanes for directing air flow to provide a desired diffusion rate within a desired radial space. Diffuser vanes are subject to the dynamic loads imparted by upstream compressor blade aerodynamic properties. The vanes are therefore configured to perform under dynamic loads while maintaining an acceptable diffusion rate.

SUMMARY OF THE INVENTION

An exemplary diffuser includes a plurality of air flow channels defined by a corresponding plurality of vanes. The vanes extend from a first side of the diffuser and define a width of the air flow channel between the corresponding plurality of vanes. The first side has at least one tapered surface extending from an inner radial position to an outer radial position. The distance between a tapered surface and a top side of the plurality of the vanes defines a depth of the air flow channel. The width of the air flow channel varies relative to the depth of the air flow channel along the length of the air flow channel.

An exemplary gas turbine engine includes a compressor section, a diffuser section, a combustor section and a turbine section. The diffuser section is in communication with the compressor section and the combustor section, and includes a diffuser and a shroud. The diffuser has a plurality of air flow channels defined by a plurality of vanes, a tapered surface, and the shroud. The plurality of vanes extends from a first side of the diffuser. The tapered surface of the first side forms the bottom of the air flow channel and extends from an inner radial position to an outer radial position. The shroud is in communication with the plurality of vanes. The air flow channels have a width determined by the distance between the corresponding plurality of vanes and a depth determined by the distance from the top side of the plurality of vanes to the tapered surface. The width of the plurality of air flow channels varies relative to the depth of the plurality of air flow channels along each of the air flow channels.

An exemplary method for directing air flow includes a diffuser having a plurality of vanes defining corresponding air flow channels receiving air flow in a radial direction. The air flow channels have depth which varies in response to a changing width of the air flow channel to maintain a desired air flow channel. The air flow is communicated through the plurality of air flow channels to deswirl vanes on the outer periphery of the diffuser. The deswirl vanes direct air flow in an axial direction to a combustor.

These and other features of the present invention can be best understood from the following specification and drawings, the following of which is a brief description.

DETAILED DESCRIPTION

Figure 1:
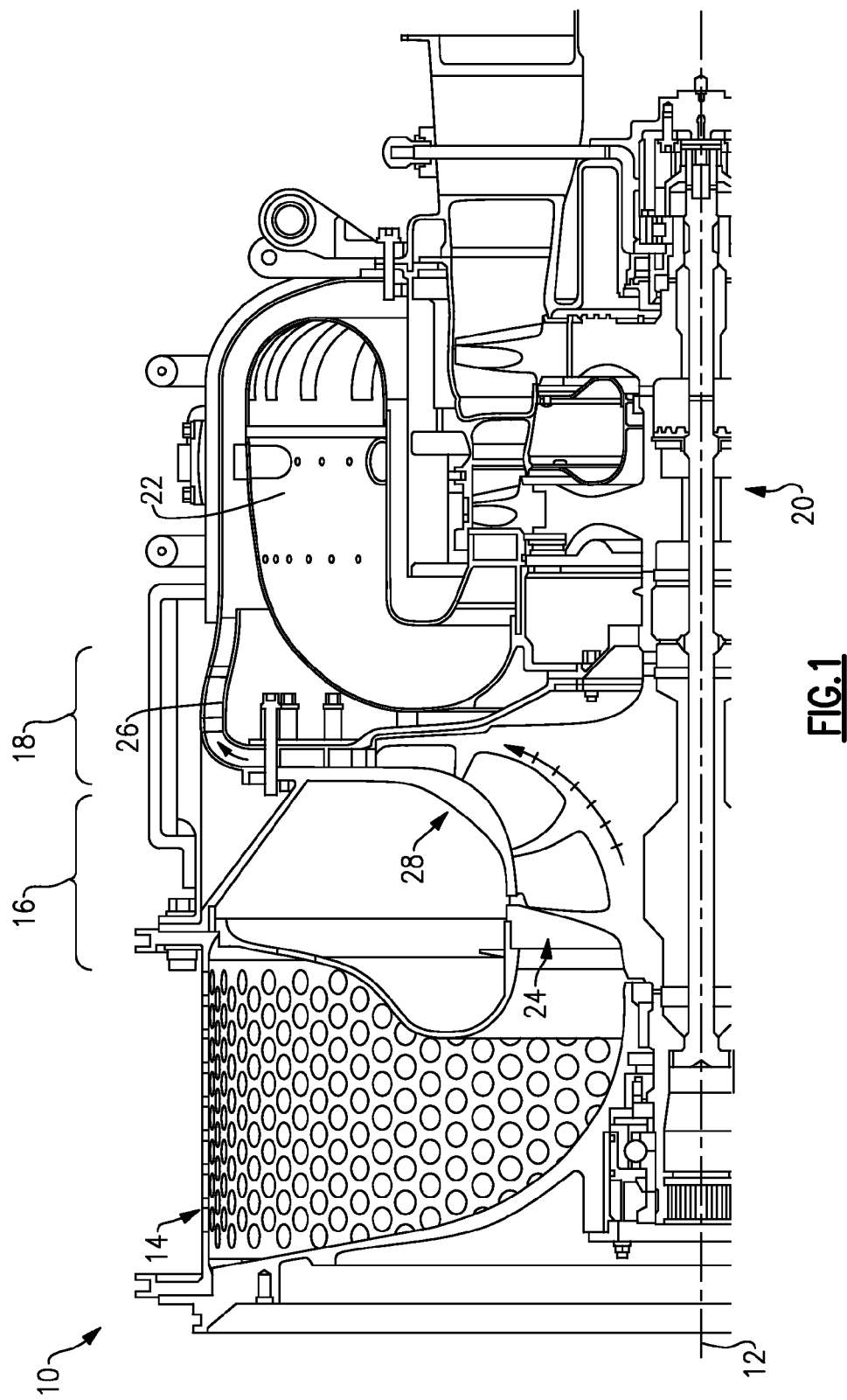
FIG. 1 is a cross-sectional view of an example gas turbine engine.

Referring to FIG. 1, selective portions of an example gas turbine engine 10 are shown. In this example, the gas turbine engine 10 is disposed about an engine axis 12. The example gas turbine engine 10 includes an air inlet 14, a compressor section 16, a diffuser section 18, a turbine section 20, and a combustion section 22. The compressor section 16 includes an impeller 24. The diffuser section 18 includes a diffuser 26 and a shroud 28. It is to be understood that other types of engines may also benefit from the examples disclosed herein, such as engines having other types of compressors, combustors, and turbines.

Figure 2:
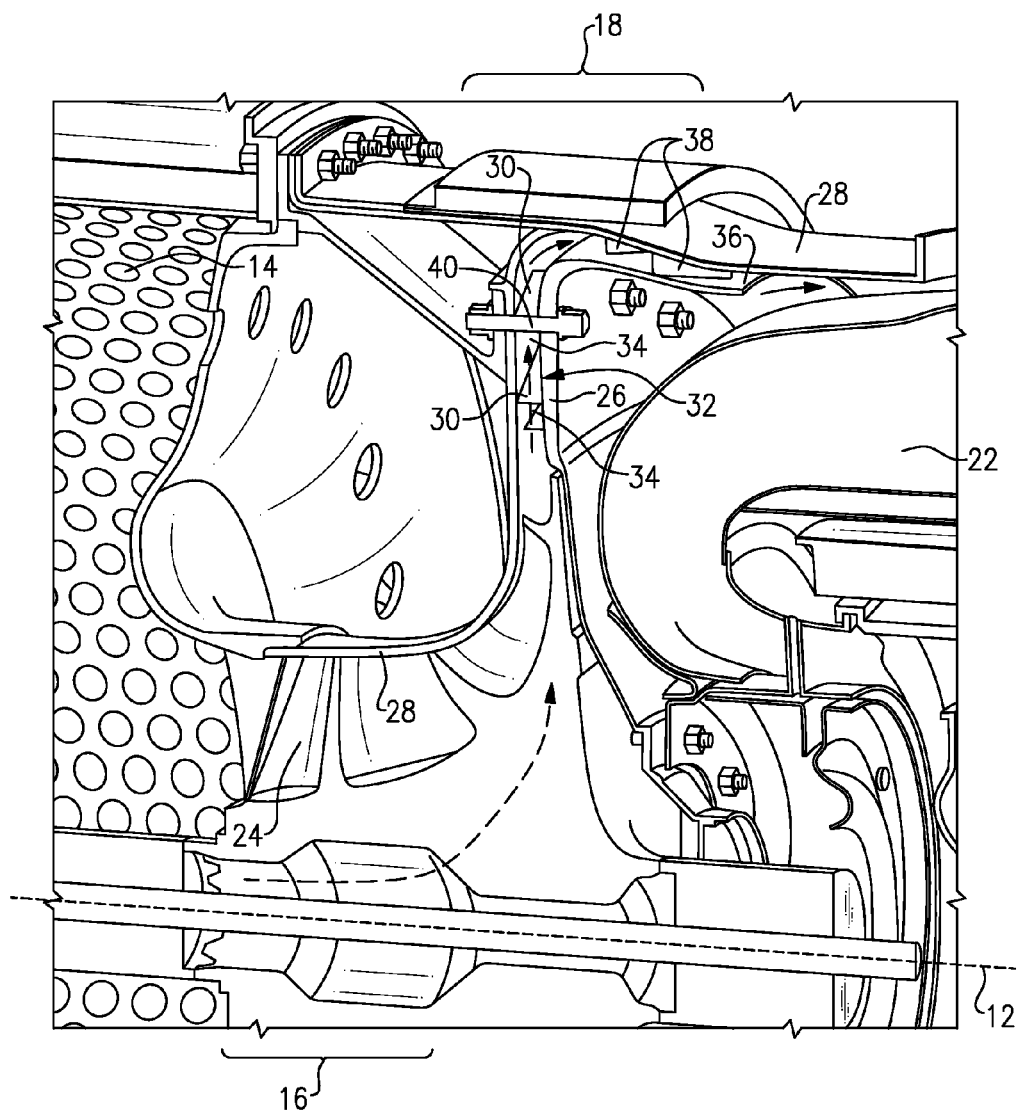
FIG. 2 is a cross-sectional view of an example diffuser and shroud.

Referring to FIG. 2, the air inlet 14 provides air flow into the compressor section 16. The impeller 24 rotates around the engine axis 12 to create a radial air flow that is communicated downstream through the compressor section 16 to the diffuser section 18.

The diffuser section 18 includes the diffuser 26 disposed annularly about the axis 12 between the compressor impeller 24 and the combustor section 22. The diffuser 26 includes a first side 32 transverse to the axis 12 that includes a plurality of air flow channels 34 defined by a plurality of vanes 30. The vanes 30 extend from the first side 32. Air flow, shown by arrows, is received from the compressor section 16 and directed radially outward through the air flow channels 34 toward an outer periphery 36 of the diffuser 26. The outer periphery 36 includes deswirl vanes 38 that direct air flow about the combustor 22.

A shroud 28 is attached to the first side 32 of the diffuser 26 to define one side of the air flow channels 34. A second, or bottom, side, of the air flow channels 34 is defined by the first side 32 of the diffuser 26. The shroud 28 surrounds the diffuser 26 and is in attached to the vanes 30 of the diffuser 26 via a fastener 40. The fastener 40 may be a screw, bolt, or other known means. Although only one fastener 40 per vane 30 is shown, it is within the contemplation of the disclosure for more than one fastener 40 to be disposed within any vane 30. The exemplary diffuser 26 can be made of stainless steel, titanium, or other comparable material. An exemplary shroud 28 can be made of an alloy, such as nickel-based superalloy INCONEL625®.

Air flow entering the diffuser 26 is moving in a radially outward direction along with swirling about the axis 12. The diffuser 26 converts the radial swirling air flow into axial air flow about the combustor 22. Air flow is transferred from the compressor section 16 through the diffuser section 18 to the combustor section 22 to continue moving downstream through the turbine section 20.

Figure 3:
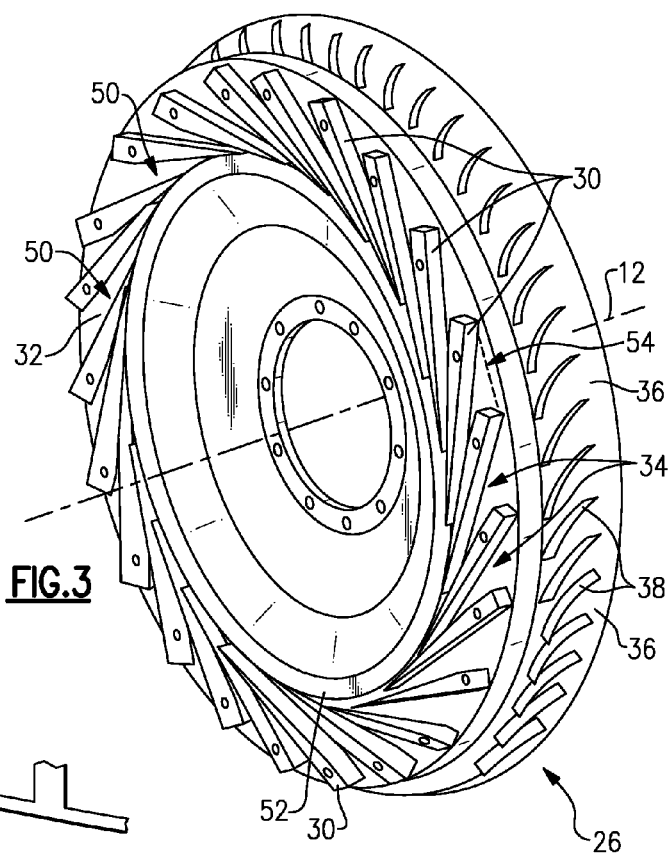
FIG. 3 is a sectional view of an example diffuser.

Referring to FIG. 3, an example diffuser 26 includes the plurality of air flow channels 34 which are defined by the plurality of vanes 30. The plurality of vanes 30 extend out from the first side 32 of the diffuser 26 and define the side walls of the air flow channels 34. At least one tapered surface 50 of the first side 32 defines a bottom side of the air flow channel 34 from an inner radial position 52 to an outer radial position 54. Each of the plurality of vanes 30 are positioned on the first side 32 to provide a continuous radial formation around the engine axis 12 such that air flow is properly directed at any position about the diffuser 26. The example plurality of vanes 30 may be uniformly spaced apart to create uniform air flow channels 34. However, it is within the contemplation of this disclosure to use any configuration of vanes 30 providing an adequate rate of diffusion through the air flow channels 34.

Each air flow channel 34 directs the radially swirling air flow provided to the diffuser 26 from the compressor impeller 24 to move to deswirl vanes 38 on the outer periphery 36 of the diffuser 26. The deswirl vanes 38 extend only a portion of the width of the outer periphery 36. The deswirl vanes 38 are present around the entire outer periphery 36 and change the air flow from a substantially radial direction to a substantially axial direction, parallel to the axis 12. In one example, the deswirl vanes 38 are perpendicular to the vanes 30.

Figure 4:
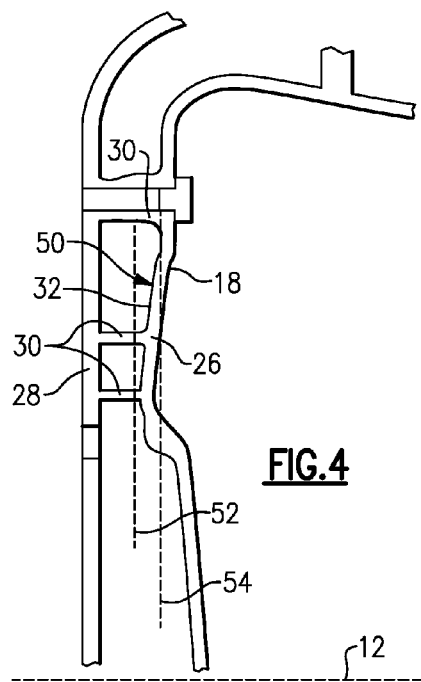
FIG. 4 is a cross-sectional view of an example diffuser and shroud.

Referring to FIG. 4, with continued reference to FIGS. 1 and 3, the exemplary tapered surface 50 of the first side 32 of the diffuser 26 begins at a first depth at an inner radial position 52 and tapers to a second depth at an outer radial position 54. The tapered surface 50 forms the bottom of the air flow channel 34. Opposite the tapered surface 50, the shroud 28 is in communication with the vanes 30 to form the top of the air flow channel 34.

Figure 5:
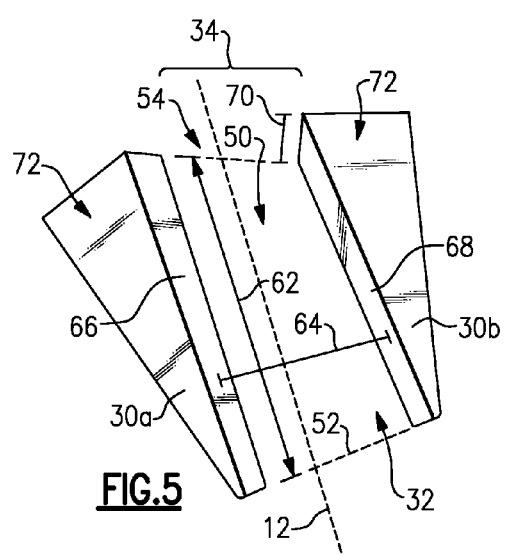
FIG. 5 is a perspective view of an air flow channel.

Referring to FIG. 5, with continued reference to FIGS. 1 and 4, the air flow channel 34 is defined by a first vane 30a, a second vane 30b, and the tapered surface 50 of the first side 32. The tapered surface 50 extends a length 62 from the inner radial position 52 to the outer radial position 54. A width 64 exists between the leading edge 66 of the first vane 30a and the trailing edge 68 of the second vane 30b. The width 64 exists at every point along the length 62 of the air flow channel 34 and varies depending on the distance between the leading edge 66 and trailing edge 68. The width 64 of the air flow channel 34 can be varied by increasing a width of either the first vane 30a or second vane 30b at any point along the air flow channel 34. The width 64 of the air flow channel 34 can also be varied by adjusting the distance between the first vane 30a and second vane 30b as well as the orientation on the first side 32 of either vane 30a, 30b.

A depth 70 is defined as the distance between the top side 72 of either the first vane 30a or the second vane 30b and the tapered surface 50. The depth 70 varies along the length 62 of the example air flow channel 34. In one example, the depth 70 increases along the length 62 between the inner radial position 52 and the outer radial position 54. An example depth for the vane 30a, 30b at the inner radial position 52 is about four-tenths of an inch (10.16 mm). However, it is within the contemplation of this disclosure to employ other depths. The width 64 will vary relative to the depth 70 along the length 62 of the air flow channel 34 to maintain an adequate diffusion rate through the air flow channel 34. Thus, the air flow channel 34 may have an increased or decreased width, at any point along the air flow channel 34 while a change in air flow diffusion rate is prevented by increasing or decreasing the depth 70 at the same point along the air flow channel 34 to maintain a desired area of the air flow channel 34.

The necessary rate of diffusion is based upon the radial space and air flow requirements of the gas turbine engine 10 while accounting for vane 30 fatigue life and resistance to foreign object intrusion. Air flow can reach the diffuser 26 with a flow velocity greater than Mach 1. The air flow channels 34 slow down the air flow as well as increase the air flow pressure to acceptable levels for entering the combustor section 22. The vanes 30 vary in width to account for factors that may reduce fatigue life and resistance to foreign object intrusion. The change in vane 30 width causes a change in the width 64 of the air flow channels 34. The depth 70 of the air flow channel 34 varies relative to the width 64 of the air flow channel 34 to maintain a desired area of the air flow channel 34. Accordingly, the example diffuser 26 achieves reduction in velocity and pressure recovery by maintaining an adequate rate of diffusion at all points along the air flow channel 34 regardless of changes in vane 30 width.

Figure 6A:
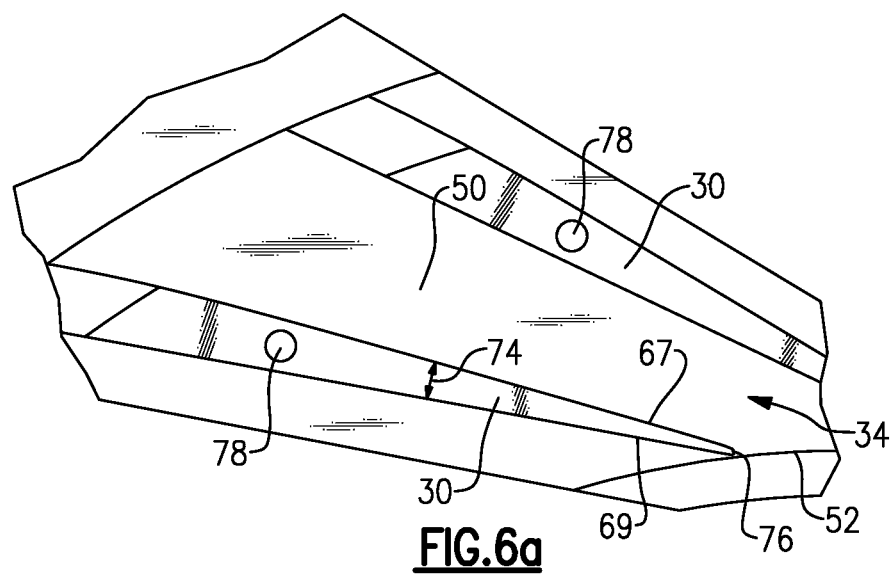
FIG. 6a is a perspective view of an example diffuser with straight vanes.

Referring to FIG. 6a, with continued reference to FIGS. 3 and 5, an example air flow channel 34 is defined by the vanes 30. The vanes 30 include a pressure side 67 and a suction side 69 which are substantially linear and form sides of the air flow channel 34. The air flow channel 34 includes a tapered surface 50 which accommodates for increases or decreases in the width of the vanes 30 relative to the depth of the vanes 30. The example pressure side 67 and suction side 69 form an angle 74 at the inner radial position 52. In one example, formed angle 74 may be within the range of three degrees to ten degrees. However, other angles 74 are within the contemplation of this disclosure. In another example, the angle 74 is 5.8 degrees. The angles 74 allow for increased thickness of the vane 30 at sections downstream from the tip 76, increasing durability. The vanes 30 may vary as to shape with regards to width, length, and curvature.

The vanes 30 include an attachment hole 78 to be used in conjunction with the fastener 40. The attachment hole 78 allows the vanes 30, and consequently the diffuser 26, to be in communication with the shroud 28 (FIG. 4). The shroud 28 and tapered surface 50 define the air flow channel 34 transverse to the engine axis 12, thereby preventing air flow from escaping the air flow channel 34.

Figure 6B:
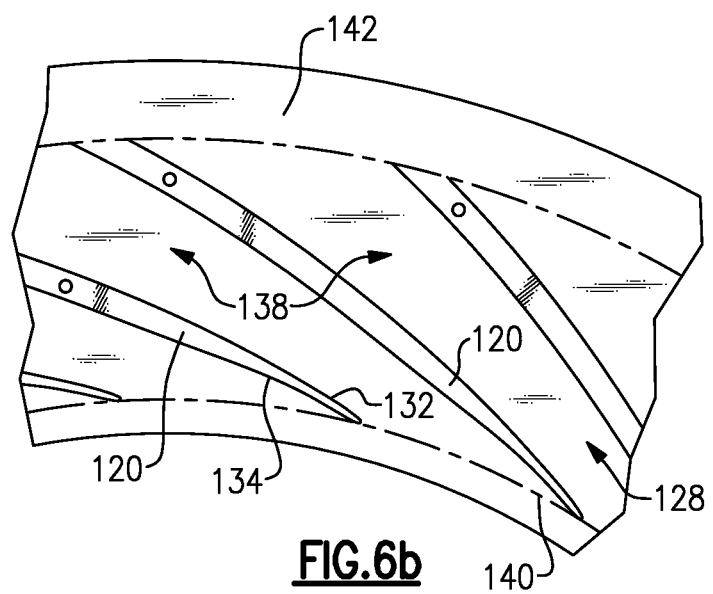
FIG. 6b is a perspective view of an example diffuser with curved vanes.

Referring to FIG. 6b, another example air flow channel 128 is defined by vanes 120. The vanes 120 are curved such that the pressure side 132 and suction side 134 may both be curved and define correspondingly curved air flow channel 128. Although vanes 130 with both the pressure side 132 and the suction side 134 are shown, it is within the contemplation of this disclosure for only one side 132, 134 to be curved. The air flow channel 128 has a bottom defined by a tapered surface 138 increasing in depth along the air flow channel 128 from an inner radial position 140 to an outer radial position 142. However, it is within the contemplation of this disclosure for the tapered surface to decrease in depth along the air flow channel 128.

Referring to FIGS. 3 and 5, in operation, air enters the air flow channel 34 between corresponding vanes 30a, 30b. The area of the air flow channel 34 is determined along the length 62 of the air flow channel 34 to provide the desired diffusion rate. As air flow moves through the air flow channel 34 from an inner radial position 52 to an outward radial position 54, increased width of the vanes 30a, 30b reduces the width 64, and correspondingly the desired area, of the air flow channel 34. To compensate for the increased width 64 and decreased area, the bottom surface 50 of the air flow channel 34 is tapered relative to the width 64 at any point along the length 62 of the air flow channel 34. This increases the depth 70 of the air flow channel 34 to provide for the desired area of the air flow channel 34 to be maintained. Therefore, any change in width 64 of the air flow channel is accommodated by a corresponding change in depth 70 to the bottom surface 50.

After moving through the plurality of air flow channels 34, the air flow is communicated to deswirl vanes 38 on the outer periphery 36 of the diffuser 26. The deswirl vanes 38 create air flow in an axial direction which is then provided to a combustor 22.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A diffuser comprising:
   a first side including an axial facing tapered surface beginning at an inner radial position including a first depth and extending to an outer radial position having a second depth, the second depth being greater than the first depth, wherein the axially facing tapered surface is continuous along a radial cross section of the diffuser;
   a plurality of air flow channels defined by a plurality of vanes corresponding to the plurality of air flow channels, wherein the plurality of vanes extend axially away from the first side axial facing tapered surface along an axis defined by the diffuser; and
   a portion of the axial facing tapered surface defines a bottom side of each air flow channel, the plurality of air flow channels having a width between the corresponding plurality of vanes and wherein said first and second depth is defined from a top side of the corresponding plurality of vanes to the axial facing tapered surface, the width of the each of the airflow channels in the plurality of airflow channels varying relative to the depth along the same air flow channel such that a cross sectional area of each of the airflow channels in the plurality of airflow channels is constant through an entire length of said air flow channel.

2. The diffuser as recited in claim 1, wherein the plurality of vanes include a vane width varying in a radial direction.

3. The diffuser as recited in claim 1, wherein an outer periphery transverse to the first side includes a plurality of deswirl vanes.

4. The diffuser as recited in claim 1, wherein a shroud is attached to the plurality of vanes.

5. The diffuser as recited in claim 1, wherein each of the plurality of vanes include at least one of a curved pressure side and a curved suction side.

6. The diffuser as recited in claim 5, wherein at least one of the plurality of air flow channels is curved.

7. The diffuser as recited in claim 1, wherein at least one vane of the plurality of vanes includes a pressure side and a suction side forming an angle greater than 2 degrees at an inner radial position.

8. The diffuser as recited in claim 3, wherein the outer periphery has a uniform axial width.

9. The diffuser as recited in claim 1, wherein the plurality of vanes are uniformly spaced apart.

10. The diffuser as recited in claim 1, wherein the plurality of vanes are radially continuous around an axis.

11. The diffuser as recited in claim 1, wherein each vane in the plurality of vanes does not extend to an outer edge of the first side.

12. The diffuser of claim 1, wherein the width of each airflow channel in the plurality of airflow channels varies relative to the depth along the air flow channel such that a desired airflow channel is maintained.

13. A method for directing airflow comprising:
    receiving air flow in a radial direction by a diffuser including a plurality of vanes defining a corresponding plurality of air flow channels and including a first side with an axial facing tapered surface beginning at an inner radial position including a first depth and extending to an outer radial position having a second depth, the second depth being greater than the first depth, wherein said first and second depth is defined from a top side of the corresponding plurality of vanes to the axial facing tapered surface, wherein the axially facing tapered surface is continuous along a radial cross section of the diffuser;
    varying the depth of each air flow channel in the plurality of air flow channels in response to a changing width of the same air flow channel to maintain a desired air flow channel area such that a cross sectional area of each of the airflow channels in the plurality of airflow channels is constant through the entire length of the air flow channel;
    communicating the air flow through the plurality of air flow channels to deswirl vanes on an outer periphery of the diffuser; and
    providing air flow in an axial direction from the diffuser to a combustor.

14. The method of claim 13, further comprising the step of changing the air flow direction.

* * * * *

UNITED STATES PATENT AND TRADEMARK OFFICE
CERTIFICATE OF CORRECTION

PATENT NO.         : 8,839,625 B2                                    Page 1 of 1
APPLICATION NO.    : 12/796028
DATED              : September 23, 2014
INVENTOR(S)        : James C. Napier It is certified that error appears in the above-identified patent and that said Letters Patent is hereby corrected as shown below:

On The Title Page, Item (73)

IN THE ASSIGNEE:

"Sunstrand" should read as --Sundstrand--

Signed and Sealed this
Twentieth Day of January, 2015

Michelle K. Lee
*Deputy Director of the United States Patent and Trademark Office*